3,038,922
PROCESS FOR PREPARATION OF
TRIETHYLALUMINUM
John C. Snyder, Darling, Pa., assignor to Hercules Powder Company, Wilmington, Del., a corporation of Delaware
No Drawing. Filed Feb. 15, 1960, Ser. No. 8,494
1 Claim. (Cl. 260—448)

The present invention relates to a process for the preparation of triethylaluminum by the reaction of ethylene and triisobutylaluminum.

It is known that ethylene will react with triisobutylaluminum to displace isobutylene and form triethylaluminum. This reaction, however, is not as simple and free from complication as might appear because there are competing reactions by which other products can be formed and thus detract from the yield of triethylaluminum. These competing reactions include the polymerization of ethylene and the so-called "growth" reaction by which ethylene adds to an aluminum alkyl to form a higher aluminum alkyl. Specifically, in the reaction of the invention there is a tendency for ethylene to add to triethylaluminum to form principally tri-n-butylaluminum.

The prior art has nevertheless recognized that the reaction of ethylene and triisobutylaluminum will proceed fairly rapidly and produce a reasonably good yield of triethylaluminum when the reaction is carried out at a temperature within the range of 50°–150° C., preferably less than 120° C., and preferably also in the presence of a catalyst, e.g., metallic nickel, cobalt or platinum.

Although the results achieved by the prior art are generally satisfactory, it has been found in accordance with the present invention that several advantages can be obtained by departing from the reaction conditions recommended by the art. More specifically, it has been found that the reaction is greatly accelerated and the formation of by-products decreased by conducting the reaction at a temperature of from about 155° to 170° C. in the absence of a catalyst and terminating the reaction short of the consumption of 95% of the triisobutylaluminum charged.

All three of the above conditions, i.e., a temperature of about 155° to 170° C., the absence of a catalyst, and termination of the reaction short of 95% conversion are interrelated and essential to the invention. Their significance is explainable by the findings made in the course of developing of the present invention:

(1) That in the presence of the catalyst it is not feasible to conduct the reaction at a temperature above about 140° C. because of excessive decomposition of the reactants, and of the product as it is formed, into metallic aluminum and other components.

(2) That if the catalyst is omitted, the reaction is greatly accelerated by increasing the temperature to about 155° C. or above, the degree of acceleration being so great, in fact, that a reaction conducted in this range proceeds at a more rapid rate than it is possible to obtain feasibly in the presence of a catalyst at any temperature, and (3) That formation of by-product tri-n-butylaluminum, which would otherwise be severe, can be minimized under the above conditions by terminating the reaction at a point where less than 95% of the triisobutylaluminum has reacted.

Illustrating and substantiating the preceding statements are the following experimental data:

In a first series of experiments the reaction of ethylene and triisobutylaluminum was carried out by bubbling ethylene through triisobutylaluminum in the presence of colloidal nickel, in the form of nickel acetylacetonate, in a glass vessel at atmospheric pressure at a series of different temperatures ranging from 80° to 160° C. It was found that under these conditions optimum results were obtained at about 135° C.; as the temperature was increased above 135° C. increasing decomposition was noted until at a reaction temperature of 160° C. extensive decomposition occurred and the yield of triethylaluminum was exceedingly small. More specifically, at the latter temperature the total reaction product amounts to less than one third of the theoretical amount and, moreover, it was a black, tarry mass from which separation of triethylaluminum was impractical.

Subsequent experiments were carried out at different temperatures in the absence of a catalyst and in a glass-lined vessel and it was found that decomposition was avoided, ostensibly entirely, at temperatures up to about 170° C. and, moreover, that at temperatures of about 155° to 170° C. the reaction proceeded more rapidly than the optimum rate that had been obtained with a catalyst at lower temperatures.

It was, however, found in connection with the preceding experiments that if it was attempted to drive the reaction to near completion, excessive growth reaction occurred resulting in the formation of tri-n-butyaluminum. More explicitly, it was found that at the point representing consumption of approximately 95% of the triisobutylaluminum the rate of the growth reaction begins to exceed the rate of the displacement reaction, thereby resulting in a decrease in the amount of triethylaluminum present.

The invention will be illustrated in the following examples in which parts and percentages are by weight unless otherwise specified.

*Example 1*

The apparatus employed in this example was a vessel having internal surfaces of glass provided with a gas inlet sparge near the bottom thereof and with means for condensing effluent vapors.

Before starting operation the reaction vessel was evacuated and then filled with nitrogen to provide an inert atmosphere for the charge of a pyrophoric triisobutylaluminum. There was then charged to the vessel 159 parts of triisobutylaluminum which was brought to a temperature of 160° C. Ethylene was sparged through the triisobutylaluminum in the vessel at the rate of 0.57 mole per liter of triisobutylaluminum per minute. Conditions of atmospheric pressure and 160° C. were maintained for approximately seven hours, during which time the course of the reaction was followed by analyzing the condensed off-gas by gas chromatography for percentage of isobutylene from which the percentage of triisobutylaluminum reacted was calculated periodically. The mole percentage of tri-n-butylaluminum in the reaction mixture was also determined periodically by analysis of samples.

In comparative experiments the reaction was run in an identical manner but at 135° C. instead of 160° C. These 135° C. experiments were made both with and without a catalyst, in the run with a catalyst, 0.7 part of nickel acetyl acetonate being added to the charge.

The data from the experiments described are given in the following table. Since the presence of the catalyst had no measurable effect in the 135° C. experiment, only one set of figures is given for this temperature:

| Time (Minutes) | Percent Triisobutylaluminum Reacted | | Mole Percent Tri-n-butylaluminum in Liquid | |
|---|---|---|---|---|
| | 160° C. | 135° C. | 160° C. | 135° C. |
| 0 | 0 | 0 | | |
| 20 | 25 | 19 | | |
| 50 | 38 | 31 | | |
| 100 | 56 | 47 | 0.48 | 0.48 |
| 200 | 87 | 74 | 1.88 | 1.64 |
| 220 | | | 2.4 | 2.0 |
| 240 | 92 | 82 | 3.08 | 2.4 |
| 260 | 94 | 86 | 3.8 | 2.84 |
| 280 | 96 | 90 | 4.8 | 3.28 |
| 300 | 97 | 92 | >6 | 3.8 |

From the preceding table it is seen that the reaction at 160° C. proceeded much more rapidly than the reaction at 135° C. Also, in the case of the 160° C. reaction it is seen that at a given degree of reaction the percentage of tri-n-butylaluminum in the reaction product is considerably less than in the 135° C. reaction. It is also seen, however, that when the reaction at 160° C. is carried beyond the point at which about 95% of the triisobutylaluminum has reacted, the increase in tri-n-butylaluminum exceeds the rate at which triisobutylaluminum is reacted, thus showing that to secure the advantages of the invention the reaction must be terminated short of the point that about 95% of the triisobutylaluminum has reacted.

The preceding example is illustrative of the advantages that are obtained by reacting ethylene with triisobutylaluminum at a temperature of about 155°–170° C. in the absence of the catalyst for the reaction, and terminating the reaction when less than 95% of the triisobutylaluminum has reacted.

As shown by the example, the reaction is carried out quite simply and conveniently by bubbling ethylene through liquid triisobutylaluminum and, if desired, recovering the isobutylene that is evolved. Although the temperature of the process is well defined, the pressure under which the reaction is carried out can be fairly widely varied. Atmospheric pressure is suitable and, in fact, preferred, but pressures up to about 100 p.s.i.g. can be utilized conveniently.

Although the process has been illustrated by a batch reaction, it can also be run continuously. One particularly convenient and advantageous method of continuous operation that has been found comprises introducing ethylene into the base of a multi-plate bubble cap column in countercurrent flow to descending triisobutylaluminum while continuously withdrawing by-product triethylaluminum from the base of the column and by-product isobutylene gas from the top of the column.

As has been emphasized, the reaction must be carried out in the absence of a catalyst for the ethylene-triisobutylaluminum displacement. The catalysts which are known and should be avoided are nickel, cobalt, iron and platinum, and compounds of these metals. Consequently, the equipment with which the process is carried out should contain none of these metals in an active form. Suitable equipment can be made of glass (including glass-lined equipment), aluminum, brass, bronze, etc.

What I claim and desire to protect by Letters Patent is:

The process for the preparation of triethylaluminum which comprises contacting triisobutylaluminum with ethylene at a temperature of about 155°–170° C. in the absence of a catalyst, and terminating the reaction when less than 95% of the triisobutylaluminum has reacted.

References Cited in the file of this patent

Angewandte Chemie, vol. 64, pages 325 and 326 (June 21, 1952).